UNITED STATES PATENT OFFICE.

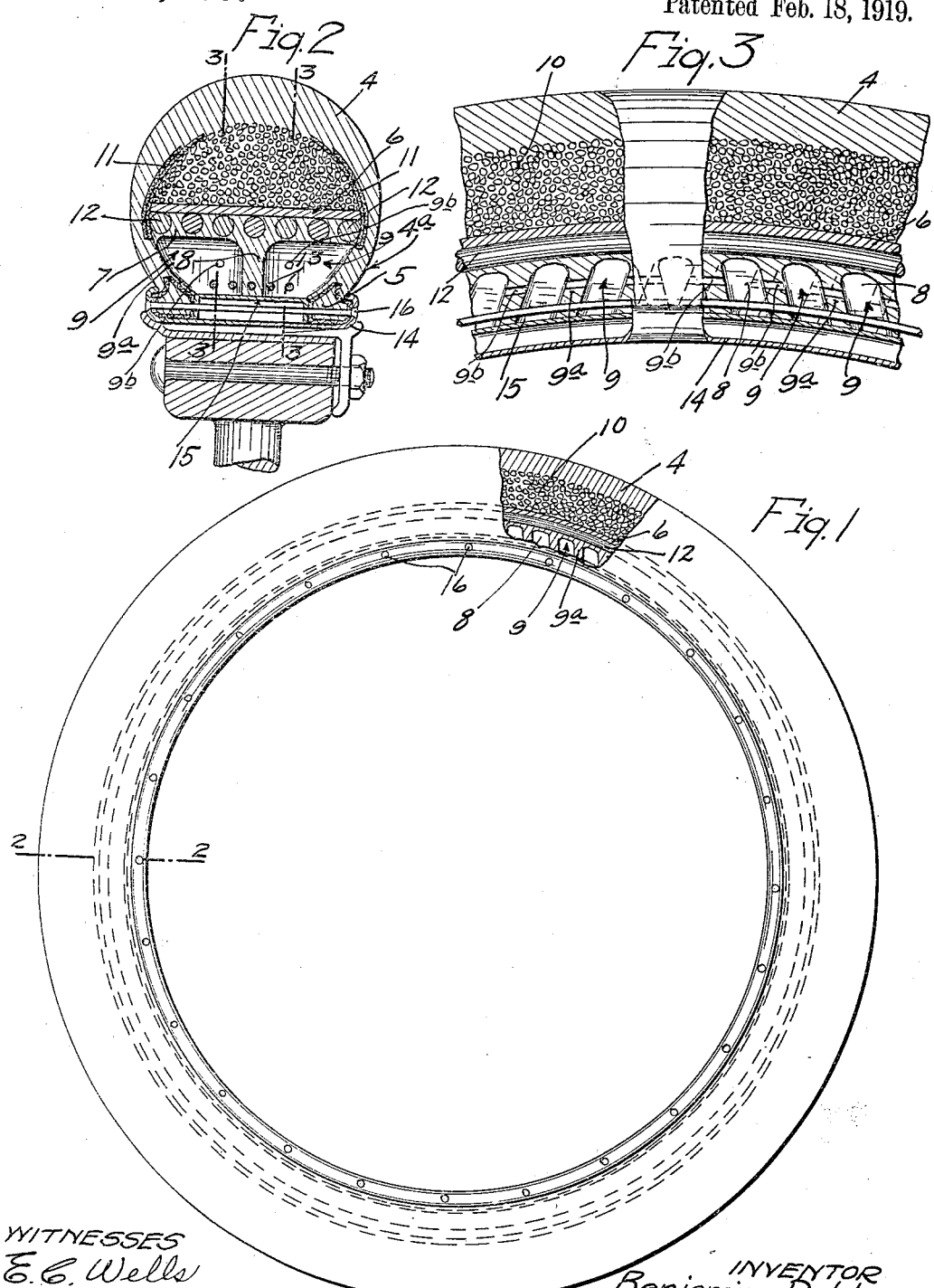

BENJAMIN DAHL, OF MINNEAPOLIS, MINNESOTA.

RESILIENT TIRE.

1,294,420.　　　　Specification of Letters Patent.　　Patented Feb. 18, 1919.

Application filed August 18, 1917.　Serial No. 186,935.

*To all whom it may concern:*

Be it known that I, BENJAMIN DAHL, a citizen of the United States, residing at Minneapolis, in the county of Hennepin and State of Minnesota, have invented certain new and useful Improvements in Resilient Tires; and I do hereby declare the following to be a full, clear, and exact description of the invention, such as will enable others skilled in the art to which it appertains to make and use the same.

My present invention relates to resilient tires, that is, to tires that are made up chiefly of rubber, but that are made more resilient than solid rubber tires, by means of air cells, metal reinforcements, etc. Generally stated, the invention consists of the novel construction and combination of parts hereinafter described and defined in the claims.

The preferred form of the improved tire is illustrated in the accompanying drawings, but it will be understood that the invention is capable of modification or deviation from the preferred form illustrated. Referring to the drawings, wherein like characters indicate like parts throughout the several views, Figure 1 is a side elevation of the complete tire, some parts being sectioned;

Fig. 2 is an enlarged section on the line 2—2 of Fig. 1, showing also a portion of a wheel to which the tire is applied; and Fig. 3 is a view chiefly in vertical section, but with some parts in full, that portion at the left being a section approximately on the left hand section line 3—3 of Fig. 2, and that portion at the right hand being a section approximately on the right hand section line 3—3 of Fig. 2.

The outer wall 4, including the tread portion of the tire is of solid rubber and is preferably formed with canvas reinforced rim beads 5. A thin flat spring metal reinforcing band 6 is embedded in the body of the tire, and extends diametrically across a very considerable portion thereof. Just inward of this metal band 6, the tire is formed with an annular rubber web 7, and with a circumferentially extended division web 8. The outer wall 4, between the beads 5 and the annular web 7, has very flexible rubber outer wall sections 4ª. Between the webs 7 and 8, and the flexible wall sections 4ª, the body of the tire is formed with air cells 9 separated by intervening solid flexible rubber partitions 9ª that perform important functions presently to be noted.

Immediately outward of and in contact with the spring band 6, the body of the tire has an interior annular cushion 10 preferably of porous or spongy rubber. Fabric binding strips 11 are embedded in the web 7, and extended from the web 7, past the edges of the spring band 6 and into the outer portion of the tire, thereby tying together the outer extremities of the web 7, and the cushion 10. These so-called binding strips 11 also prevent the edges of the metal band 6 from wearing through the rubber side walls of the tire. The rubber web 7 is reinforced by a multiplicity of light spring metal hoops 12, preferably made of heavy spring tempered wire and embedded in the said web 7 and holding the latter in contact with the inner surface of the spring metal reinforcing band 6. Lighter spring metal or wire hoops 13 are embedded in the inner portion of the partition webs 8 and 9ª and serve to hold the same against the rim presently to be described.

As shown, the tire is provided with an attached demountable metal rim 14. This rim, as shown, is made up of two flanged sections and an annular spacing rim 15, and the said parts 14 and 15 are secured together and to the rim beads 5 of the tire by long rivets 16 passed therethrough, as best shown in Fig. 2. In this arrangement, the hoops 13 lie out of contact with but close to the annular spacing rim 15 and hold the tire properly seated against the same.

The metal reinforcing band 6, of course, normally tends to keep the tire in true circular form and distributes the strain from the load throughout the tire, but, moreover, it very greatly reinforces the tire against lateral sway. The air cells 9 and webs 9ª and 8 give the tire great resilience, and in fact, give the tire too great resilience and not enough load carrying capacity were it not for the metal reinforcing band 6. When this spring metal band is combined with the said air cells and webs, it prevents the load from crushing the tire at any one point and distributes the load through a very large number of the said webs, inasmuch as it must stretch some of the webs and compress others in order to permit the tire to be flattened under load.

As shown, the webs 9ª on the opposite sides of the web 8 are circumferentially oblique in opposite directions, so that they neutralize the tendency of the tire to creep or move circumferentially under load.

The annular cushion 10, of course, adds additional resilience to the tire, but it prevents also the tread portion of the tire from chafing against the metal band 6, and moreover, it gives to the tire a pliability and adapts it to absorb a shock of small stones, and the like, at the intermediate point of contact. Otherwise stated, the cushion 10 will absorb much of the minor shocks due to small obstructions, and the greater shocks will be absorbed in the spring band 6 and in the pliable rubber webs 8 and 9ᵃ, and in the walls 4ᵃ.

A tire of the above type will have a resilience very closely approximating that of a pneumatic tire, and, of course, has the great advantages that it is puncture proof and may be used until entirely worn out.

Preferably, the walls 9ᵃ between the air cells 9 have small air passages 9ᵇ therein which connect the air cells in series. These small air passages assist in the completion of the construction of the tire and distribute the air throughout the cells in the running action.

The cushion 10 and webs 7, 8 and 9ᵃ are preferably either integral or substantially integral and the binding strips 11 are firmly united with all of the parts with which they come into contact. By reference to Fig. 3, it will be noted that the aggregate cross section of the air cells 9 is materially greater than the aggregate cross section of the intervening webs 9ᵃ, thus giving greater flexibility to the tire.

What I claim is:

1. A resilient tire having an internal spring metal band embedded therein and reinforcing the same, said tire, inward of said band, having a circumferentially extended division web and air cells on the opposite sides of said division web, the said air cells being inclosed by the side walls of said tire.

2. A resilient tire having an internal spring metal band embedded therein and reinforcing the same, said tire, inward of said band, having a circumferentially extended division web and air cells on the opposite sides of said division web, the said tire having flexible rubber side walls inclosing the said air cells and giving great flexibility to the tire.

3. A resilient tire provided with a spring metal band embedded therein and reinforcing the same, said tire having internal air cells inward of said band, and laterally spaced spring metal reinforcing hoops embedded in said tire immediately adjacent to the inner surface of said spring metal band.

4. The combination with the outer wall of a resilient tire, of a flat spring metal band embedded in said tire and reinforcing the same, said tire having an internal annular web immediately adjacent the inner surface of said spring band, spaced air cells being formed in said tire inward of said annular web, an embedded annular body of porous cushion material immediately surrounding said spring metal band, and fabric binding strips extending from said cushioning material past the edges of said metal band and into the said annular web.

5. The combination with the outer wall of a resilient tire, of a flat spring metal band embedded in said tire and reinforcing the same, said tire having an internal, annular web immediately adjacent the inner surface of said spring band, spaced air cells being formed in said tire inward of said annular web, an embedded annular body of porous cushion material immediately surrounding said spring metal band, fabric binding strips extending from said cushioning material past the edges of said metal band and into the said annular web, and laterally spaced resilient metal hoops embedded in the said annular web immediately adjacent to the inner surface of said spring metal band.

6. The combination with the outer wall of a resilient tire, of a flat spring metal band embedded in said tire and reinforcing the same, said tire having an internal annular web immediately adjacent the inner surface of said spring band, spaced air cells being formed in said tire inward of said annular web, an embedded annular body of porous cushion material immediately surrounding said spring metal band, fabric binding strips extending from said cushioning material past the edges of said metal band and into the said annular web, and laterally spaced resilient metal hoops embedded in the said annular web immediately adjacent to the inner surface of said spring metal band, and another series of resilient metal hoops extended through the webs between cells closely adjacent to the rim-engaging portion of the tire.

7. A resilient tire having an internal spring metal band embedded therein and reinforcing the same, said tire, inward of said band, having a circumferentially extended division web and air cells on the opposite sides of said division web, the said air cells being inclosed by the side walls of said tire, the said air cells, on opposite sides of said division web being reversely oblique in a circumferential direction for the purposes set forth.

8. A tire having a resilient body, and a flat spring metal band embedded therein, said resilient body having resilient walls and having air cells between said resilient walls and inward of said spring metal band.

9. A tire having a resilient body and a flat spring metal band embedded therein, said resilient body having resilient walls and having air cells between said resilient walls and inward of said spring metal band, the body of said tire being approximately circular in cross section, and the said spring band being located approximately midway between the inner and outer portions of said tire.

10. A tire having a resilient body and a flat spring metal band embedded therein, said resilient body having resilient walls and having air cells between said resilient walls and inward of said spring metal band, the walls between said air cells having correspondingly small air passages therein connecting the said cells in series.

11. A resilient tire provided with a spring metal band embedded therein and reinforcing the same, said tire having resilient side walls inward of said band and having between said resilient side walls, inward of said metal band, a multiplicity of circumferentially spaced air cells separated by resilient partitions, the aggregate cross section of which partitions is materially less than the aggregate cross section of said air cells.

In testimony whereof I affix my signature in presence of two witnesses.

BENJAMIN DAHL.

Witnesses:
CLARA DEMAREST,
BERNICE G. BAUMANN.

Copies of this patent may be obtained for five cents each, by addressing the "Commissioner of Patents, Washington, D. C."